United States Patent [19]

Crossan, Jr.

[11] Patent Number: 5,630,280
[45] Date of Patent: May 20, 1997

[54] DUAL AXIS ELECTROLYTIC TILT SENSOR

[75] Inventor: Wallace R. Crossan, Jr., Huntingdon Valley, Pa.

[73] Assignee: The Fredericks Company, Huntingdon Valley, Pa.

[21] Appl. No.: 432,102

[22] Filed: May 1, 1995

[51] Int. Cl.⁶ ............................................. G01C 9/06
[52] U.S. Cl. ............................................. 33/366
[58] Field of Search ................................. 33/366

[56] References Cited

U.S. PATENT DOCUMENTS

| | | |
|---|---|---|
| 2,713,726 | 7/1955 | Dixson . |
| 2,713,727 | 7/1955 | Balsam . |
| 2,852,646 | 9/1958 | Broadley, Jr. . |
| 2,932,809 | 4/1960 | Schoeppel et al. . |
| 2,936,411 | 5/1960 | Doty ............................ 33/366 |
| 3,020,506 | 2/1962 | Remington et al. . |
| 3,171,213 | 3/1965 | Swarts et al. ................. 33/366 |
| 3,227,984 | 1/1966 | Halliday . |
| 3,290,786 | 12/1966 | Parkin ........................... 33/366 |
| 3,293,395 | 12/1966 | Halliday . |
| 3,293,396 | 12/1966 | Boyd . |
| 3,409,993 | 11/1968 | Hansen . |
| 3,487,303 | 12/1969 | Remington .................... 33/366 |
| 3,497,950 | 3/1970 | Squire et al. . |
| 3,823,486 | 7/1974 | Bhat et al. . |
| 3,843,539 | 10/1974 | Willing et al. . |
| 3,946,494 | 3/1976 | Wells . |
| 3,992,951 | 11/1976 | Erspamer et al. ............ 33/366 |
| 4,028,260 | 6/1977 | Zuest . |
| 4,528,760 | 7/1985 | Plummer . |
| 4,536,967 | 8/1985 | Beitzer . |
| 4,628,612 | 12/1986 | Hori et al. . |
| 4,641,434 | 2/1987 | Engler . |
| 4,797,661 | 1/1989 | Wiley . |
| 4,937,518 | 6/1990 | Donati et al. . |
| 5,031,329 | 7/1991 | Smallidge . |
| 5,079,847 | 1/1992 | Swartz et al. . |
| 5,159,761 | 11/1992 | Cagan et al. . |
| 5,170,567 | 12/1992 | Davis et al. . |
| 5,174,033 | 12/1992 | Rider . |
| 5,180,986 | 1/1993 | Swartz et al. . |
| 5,279,040 | 1/1994 | Kippelt et al. . |

FOREIGN PATENT DOCUMENTS

| | | | |
|---|---|---|---|
| 117226 | 8/1984 | European Pat. Off. ............ | 33/366 |
| 0358788 | 3/1990 | European Pat. Off. . | |
| 2647544 | 11/1990 | France . | |
| 3608274 | 9/1986 | Germany . | |
| 4025184 | 2/1992 | Germany ............................. | 33/366 |
| 53810 | 3/1985 | Japan ................................... | 33/366 |
| 1063990 | 12/1983 | U.S.S.R. ............................. | 33/366 |
| 1137298 | 1/1985 | U.S.S.R. ............................. | 33/366 |
| 1587183 | 8/1990 | U.S.S.R. ............................. | 33/366 |
| 733973 | 7/1955 | United Kingdom . | |

*Primary Examiner*—Thomas B. Will
*Attorney, Agent, or Firm*—Dilworth & Barrese

[57] ABSTRACT

A dual axis electrolytic tilt sensor is disclosed which includes a spherical enclosure that houses a plurality of electrodes partially immersed in an electrolytic solution. The electrodes have arcuate contact portions and the spherical inner surface of the enclosure defines a common electrode. When connected to an appropriate electrical circuit, the sensor produces a substantially linear output voltage in proportion to tilt angle.

20 Claims, 6 Drawing Sheets

DUAL AXIS ELECTROLYTIC TILT SENSOR

BACKGROUND OF THE INVENTION

1. Field of the Invention

This invention relates to electrochemical devices, and more particularly, to electrolytic tilt sensors.

2. Description of the Related Art

Electrolytic tilt sensors include devices that provide an output voltage proportional to tilt angle and a phase indicative of tilt direction when configured as part of an appropriate electrical circuit. Tilt sensors, originally conceived for weapons delivery and aircraft navigation, are presently used in applications such as oil rig leveling and bore angling, construction laser systems, automotive wheel alignment, seismic and geophysical monitoring, and virtual reality systems.

An electrolytic tilt sensor is typically comprised of a glass envelope or housing that is partially filled with an electrolytic solution and a plurality of conductive electrodes (including one common electrode) which are partially immersed in the electrolytic solution. A portion of the cell which remains unfilled defines a gaseous bubble, which shifts as the cell is tilted, also causing the electrolyte to shift. Consequently, the electrodes become more or less immersed by the electrolyte as the bubble shifts. This shift provides a change in impedance between any one electrode and the common electrode. When the tilt sensor electrodes are configured as part of an appropriate electrical circuit, the angle of tilt may be correlated to an output voltage of the circuit.

The geometric configuration of the enclosure and the arrangement and shape of the electrodes effects the quality and performance of each tilt sensing device. Moreover, the construction of the device directly effects the linearity of its output signal. Various geometric configurations of devices have been disclosed in the prior art, for example, U.S. Pat. No. 2,713,726 discloses a rectangular enclosure; U.S. Pat. No. 3,487,303 discloses a spherical housing; U.S. Pat. No. 3,823,486 discloses a housing having a toroidal configuration; and U.S. Pat. No. 5,170,567 discloses a cylindrical housing.

The spherical device described in U.S. Pat. No. 3,487,303 has a glass housing that consists of two hemispherical portions which are sealed together to form a unitary sphere. Two rectangular electrodes are embedded in the walls of the hemispherical sections and are disposed in diametrical opposition. Another electrode is suspended in the lower portion of the sphere by a plurality of legs which are connected by a ring that is embedded in the wall of the glass enclosure. In a steady upright position, one half of each of the two embedded electrodes are immersed in solution, and the suspended electrode is completely immersed. This geometry provides constant length electrical paths between the electrodes irrespective of the orientation of the device. Consequently, the output potential of the device will be substantially linear. Although the configuration of this device provides advantages over other prior art tilt sensors, it is extremely difficult to fabricate at a low cost. Therefore, it is an object of the subject invention to provide a low cost tilt sensor with improved accuracy and linearity.

SUMMARY OF THE INVENTION

The subject invention is directed to a dual axis electrolytic tilt sensing device which produces a substantially linear output voltage when employed in an appropriate electrical circuit. The device includes a spherical containment vessel which sealingly houses an electrolytic solution and a plurality of electrodes. The containment vessel has an inner surface defining a common electrode, and the plurality of electrodes each include an arcuate contact portion housed within the containment vessel and a lead portion which depends from the containment vessel. Preferably, the arcuate contact portion of each electrode has a radius of curvature that is less than the radius of the inner surface of the spherical containment vessel.

The spherical containment vessel is formed of a metallic material, and includes two hemispherical sections hermetically sealed to one another. Each hemispherical section has a peripheral flange provided thereon which together define an equatorial flange about the containment vessel when the two sections are hermetically sealed to one another. One of the hemispherical sections defines an upper section and the other defines a lower section. The upper section has a filling hole formed therein for introducing the electrolytic solution into the containment vessel, and a plug is provided for plugging the filling hole. The lower hemispherical section has an aperture formed therein through which the lead portions of the plurality of electrodes extend to depend from the containment vessel.

A glass preform structure is maintained in the aperture to seal the containment vessel, insulate the lead portions of each electrode from the containment vessel, and maintain the spacing between each electrode. The plurality of electrodes includes two pairs of electrodes, each pair defining a distinct tilt axis, and they are formed from the same metallic material from which the containment vessel is formed. The radius of curvature of the arcuate contact portion of each electrode is constant, and preferably it is greater than one half of the radius of the spherical containment vessel. The arcuate contact portion of each electrode has a terminal end, and the terminal ends coincide with a common insulator.

In another preferred embodiment of the subject invention, the tilt sensor comprises a containment vessel for sealingly containing an electrolytic solution and having a spherical inner surface which defines a common electrode, and plurality of electrodes each including an arcuate contact portion housed within the containment vessel and a lead portion depending from the containment vessel. Preferably, the plurality of electrodes includes a first pair of electrodes arranged in such a manner so that the arcuate contact portions thereof form a first great circle of a sphere which is concentric with the spherical inner surface of the containment vessel, the first great circle defining a first tilt axis, and a second pair of electrodes arranged in such a manner so that the arcuate contact portions thereof form a second great circle of the sphere defining a second tilt axis which is orthogonal to the first tilt axis.

These and other features of the subject invention will become more readily apparent to those skilled in the art from the following detailed description of the preferred embodiments of the invention taken in conjunction with the drawings.

BRIEF DESCRIPTION OF THE DRAWINGS

So that one skilled in the art to which the subject invention appertains will better understand how to make and use the invention, preferred embodiments thereof will be described hereinbelow with reference to the drawings wherein.

DETAILED DESCRIPTION OF THE PREFERRED EMBODIMENTS

Figure 1:
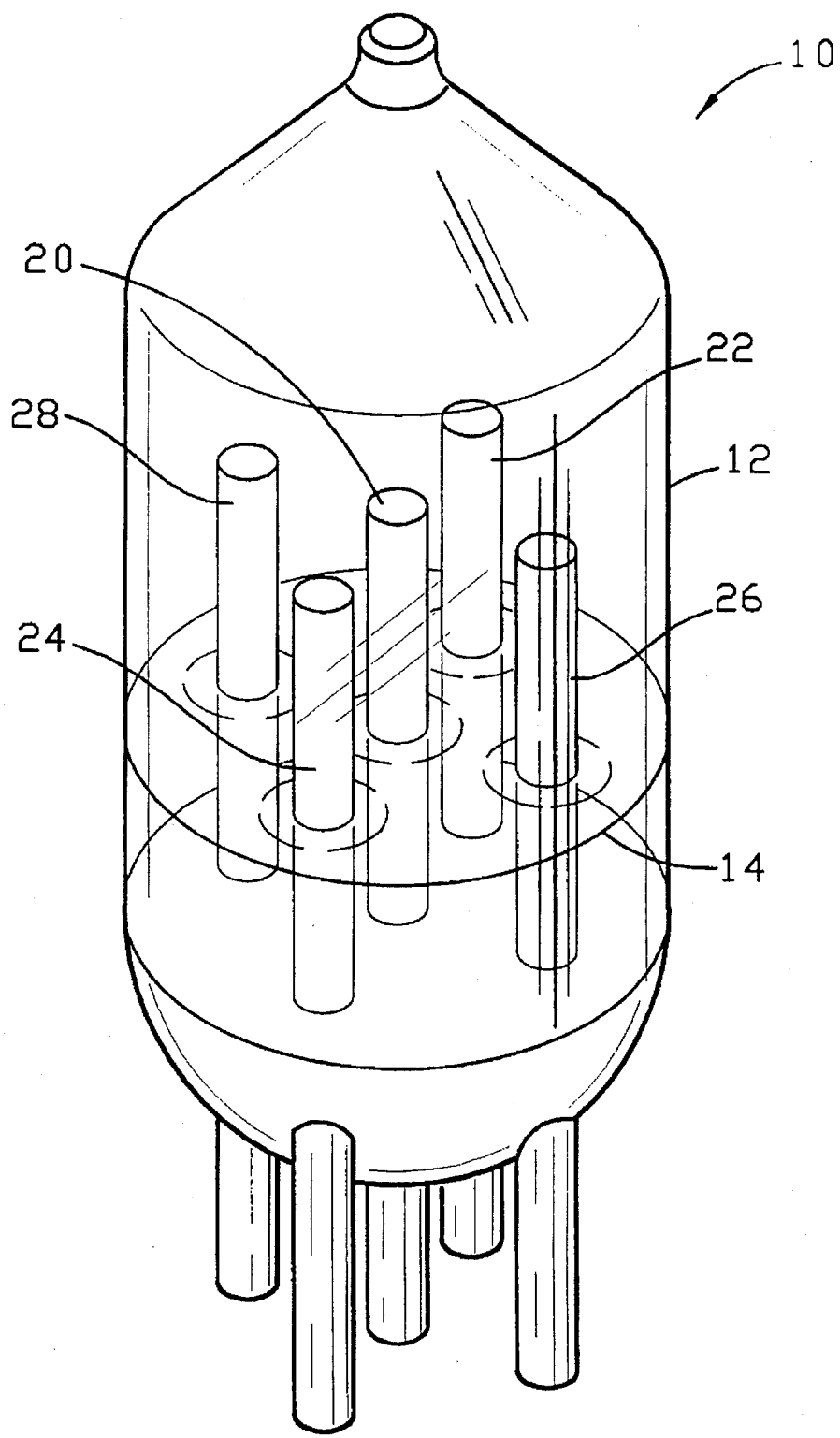
FIG. 1 is a perspective view of a prior art dual axis electrolytic tilt sensor which has a cylindrical glass housing and five partially immersed electrodes including one common electrode.
Figure 1A:
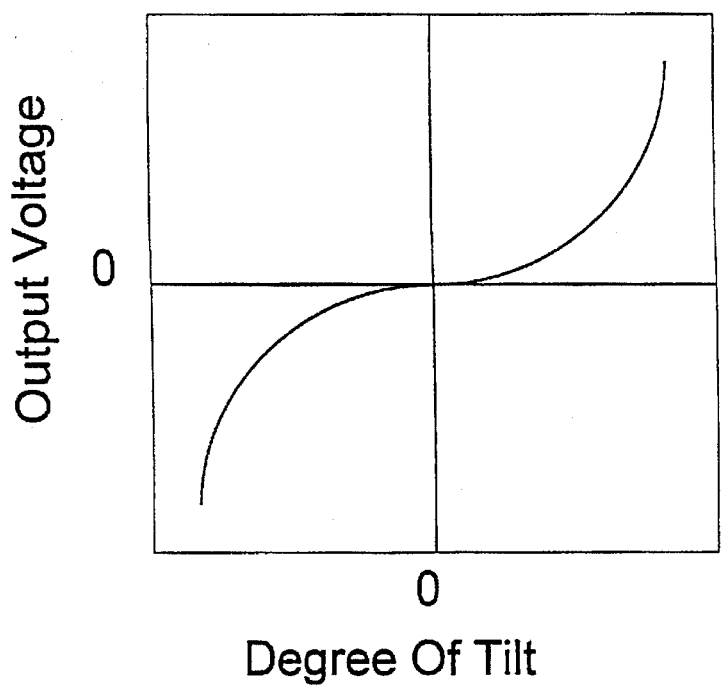
FIG. 1a is a graphical representation of the output voltage of the prior art tilt sensor of FIG. 1 as compared to tilt angle.

Referring now to the drawings, there is illustrated in FIG. 1 a prior art dual axis electrolytic tilt sensor 10 which has a cylindrical housing 12 fabricated from glass. A plurality of metal electrodes are supported within the housing and are partially immersed in an electrolytic solution 14. The electrodes include a common electrode 20 and two pairs of spaced apart axial electrodes 22, 24 and 26, 28. Each electrode pair defines a distinct tilt axis with the common electrode. In operation, when the prior art tilt sensor 10 is connected to an appropriate electrical circuit, it will produce a non-linear output signal when tilted about a horizontal axis (see, for example, FIG. 1a). This non-linearity results from the geometry of the housing and the arrangement of the electrodes.

Figure 2A:
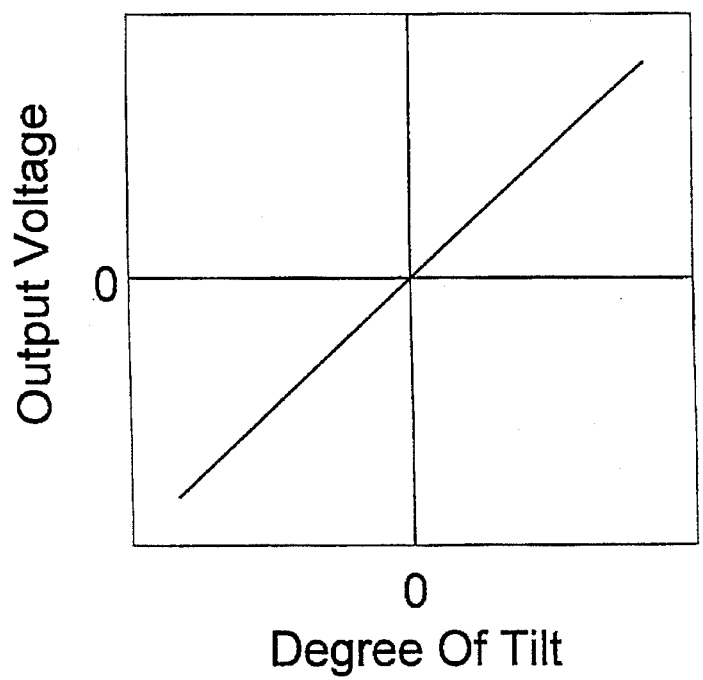
FIG. 2a is a graphical representation of the output voltage of the tilt sensor of FIG. 2 as compared to tilt angle.
Figure 2:
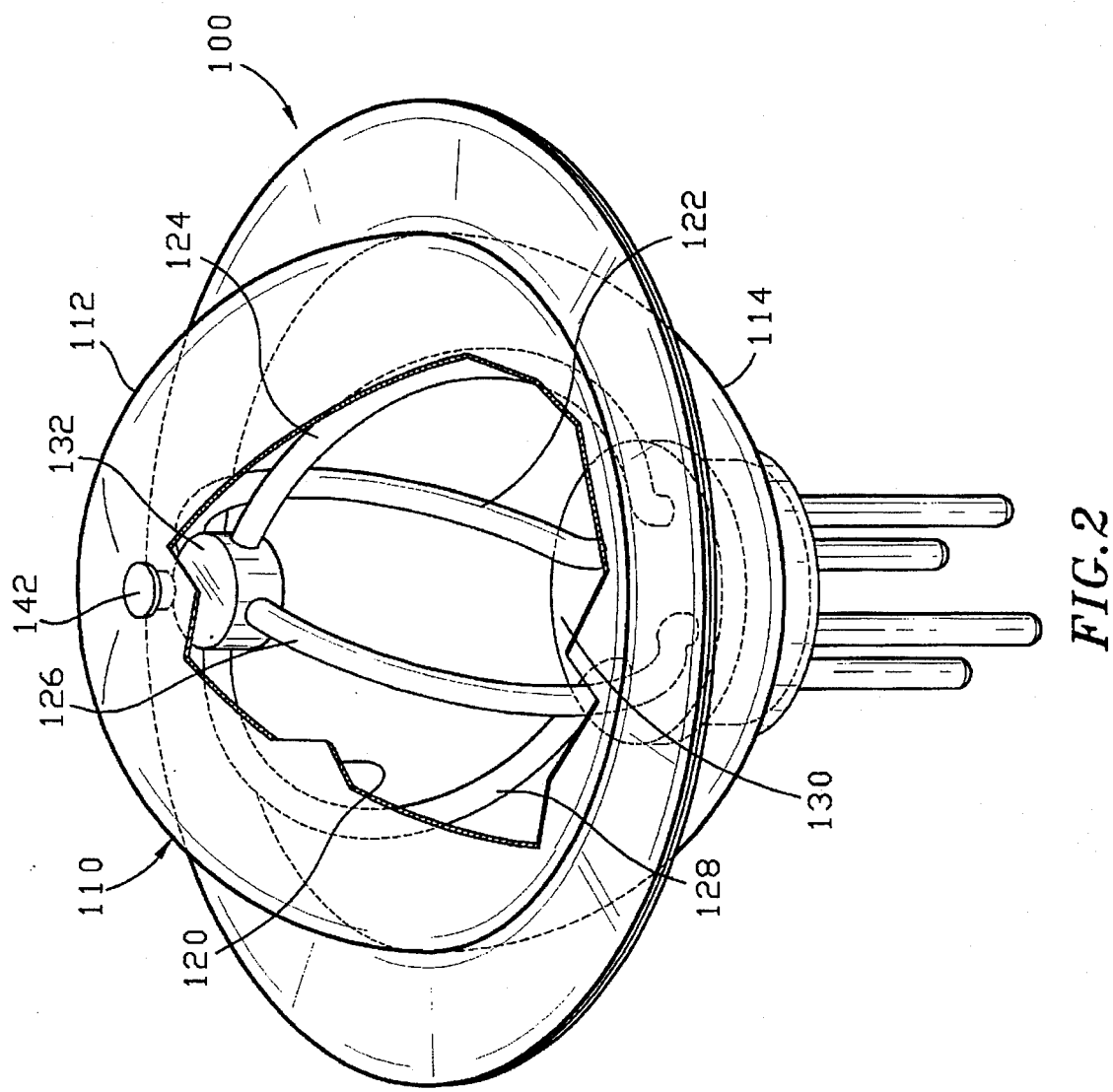
FIG. 2 is a perspective view of a dual axis electrolytic tilt sensor constructed in accordance with a preferred embodiment of the subject invention, with a portion of the metal housing thereof cut-away to illustrate the arcuate electrodes housed therein.
Figure 3:
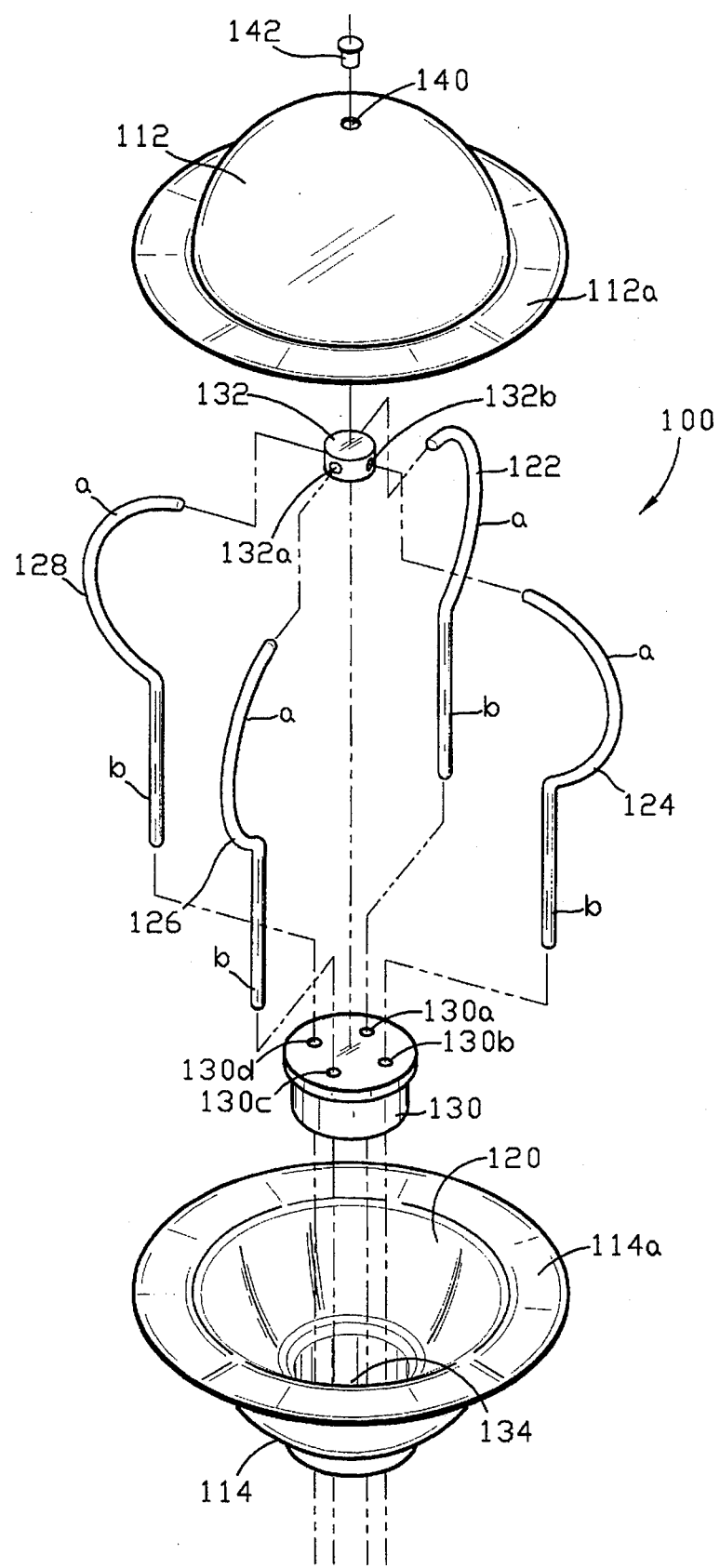
FIG. 3 is an exploded perspective view, with parts separated for ease of illustration, of the tilt sensor of the subject invention.

Referring to FIGS. 2 and 3, a dual axis electrolytic tilt sensor constructed in accordance with a preferred embodiment of the subject invention is illustrated and is designated generally by reference numeral 100. The housing 110 of tilt sensor 100 is constructed of metal and is formed from two hemispherical portions 112 and 114. Circumferential flanges 112a and 114a extend respectively about the equatorial limits of the two housing portions. During fabrication, the housing portions are welded to one another along the edges of the flanges to create a hermatic seal. Once connected, the inner surface 120 of spherical housing 110 defines the common electrode of tilt sensor 100.

Figure 6:
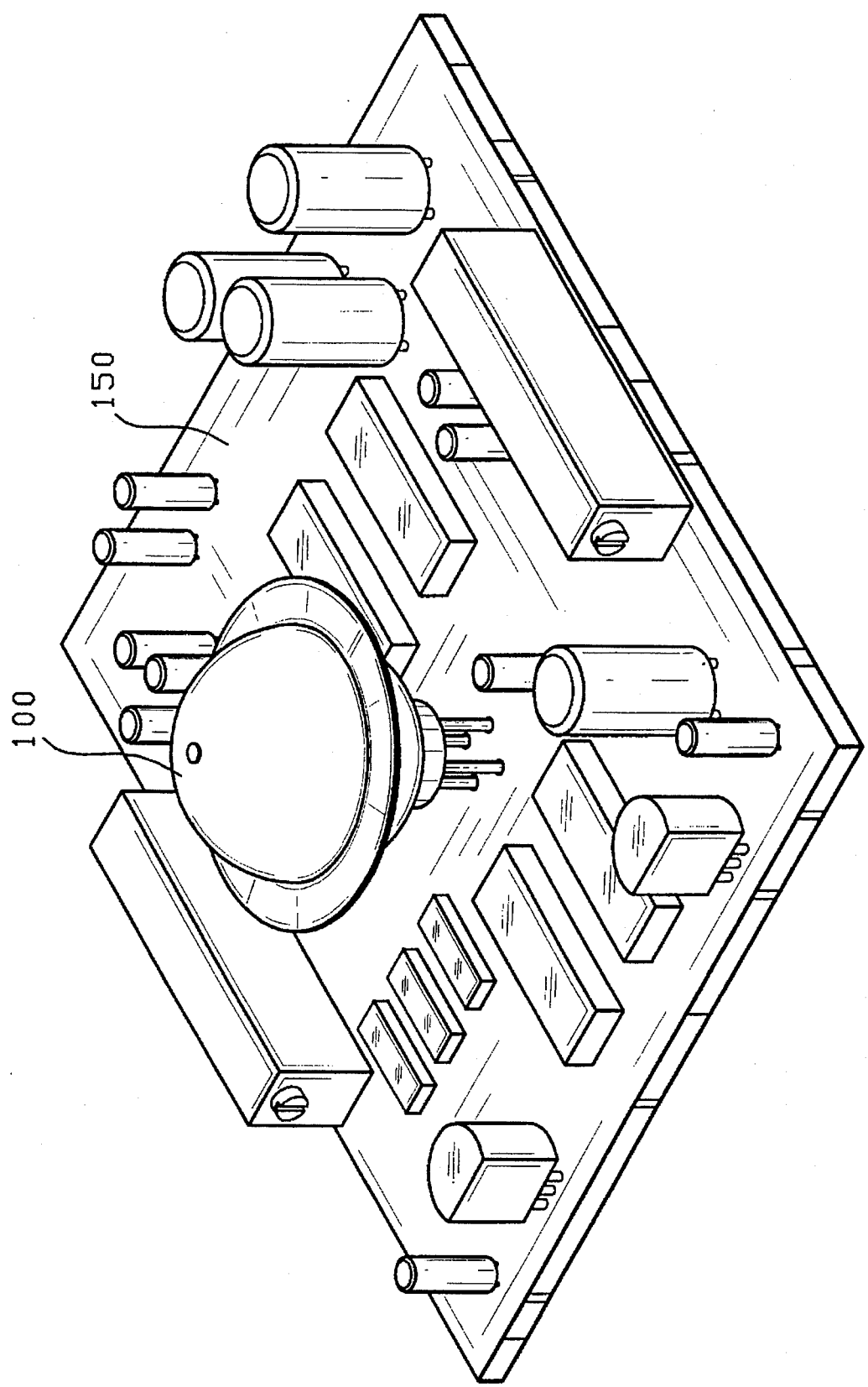
FIG. 6 is a perspective view of an electronic circuit board containing the tilt sensor of the subject invention.

The axial electrodes of tilt sensor 100 are identified by reference numerals 122, 124, 126 and 128. Each electrode has an arcuate contact portion "a" and an elongate lead portion "b". The arcuate contact portion of each electrode has a constant radius of curvature that is less than the radius of the inner surface 120 of sensor housing 110, preferably greater than one half of the radius of the housing. The lead portions of each electrode depend from sensor housing 110 to facilitate the connection of the sensor to an electronic circuit board (see FIG. 6).

The electrodes are supported in the sensor housing by two preformed glass insulating structures, a seal 130 and a retainer 132. Seal 130 is dimensioned and configured to engage an aperture 134 formed in the lower portion 114 of sensor housing 110. Four apertures 130a–130d extend through seal 130 to accommodate the lead portion of each electrode. Two ports 132a and 132b extend through retainer 132 transverse to one another to accommodate the terminal end of the contact portion of each of the four electrodes. During fabrication, the electrode leads are positioned within seal 130, the electrode terminal ends are positioned in retainer 132, and the entire assembly is fired either in a kiln or by torch.

Figure 4:
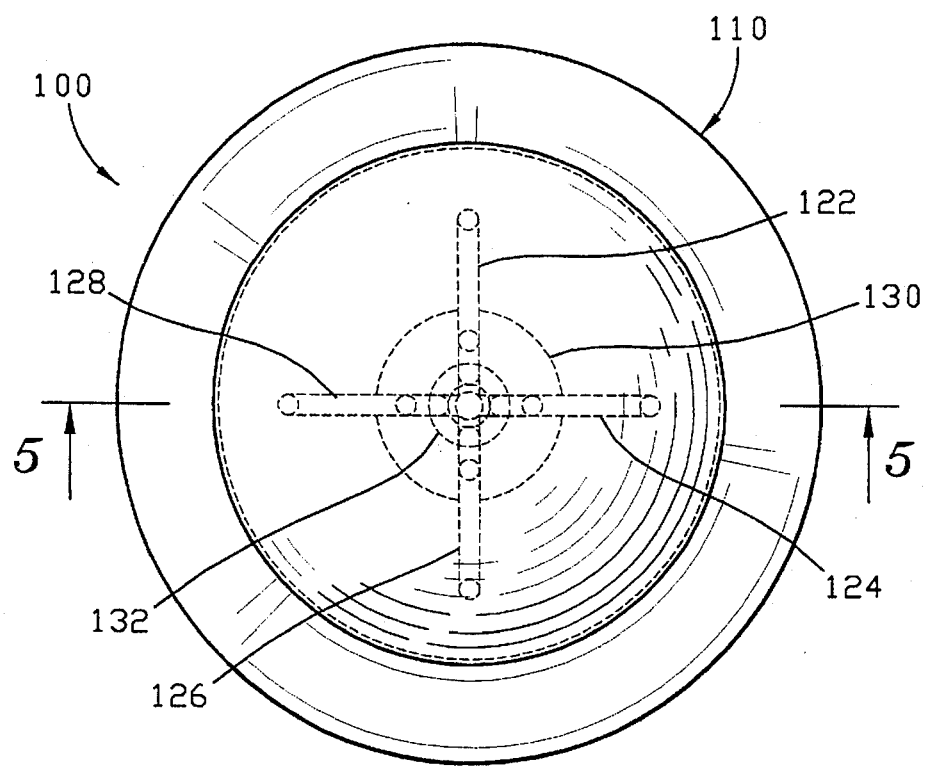
FIG. 4 is a top plan view of the tilt sensor of the subject invention illustrating the arrangement of the electrodes within the sensor housing.

Referring to FIG. 4, the insulating structures insulate the axial electrodes from one another and from the common electrode, and maintain the appropriate spacing between each electrode to ensure that the arcuate portions thereof delimit a sphere within spherical housing 110. More particularly, the electrodes are arranged so that the contact portions of the two electrode pairs define first and second great circles of a sphere that is concentric with the spherical inner surface 120 of housing 110. Each great circle defines a distinct tilt axis of the sensor with the inner surface of the housing serving as the common electrode. Thus, in operation, the gap that exists between the common electrode and the arcuate contact portion of any of the axial electrodes remains constant at any tilt angle. Consequently, when tilt sensor 100 is employed in an appropriate electronic circuit 150, as shown for example in FIG. 6, it generates a substantially linear output voltage (see, for example, FIG. 2a).

Figure 5:
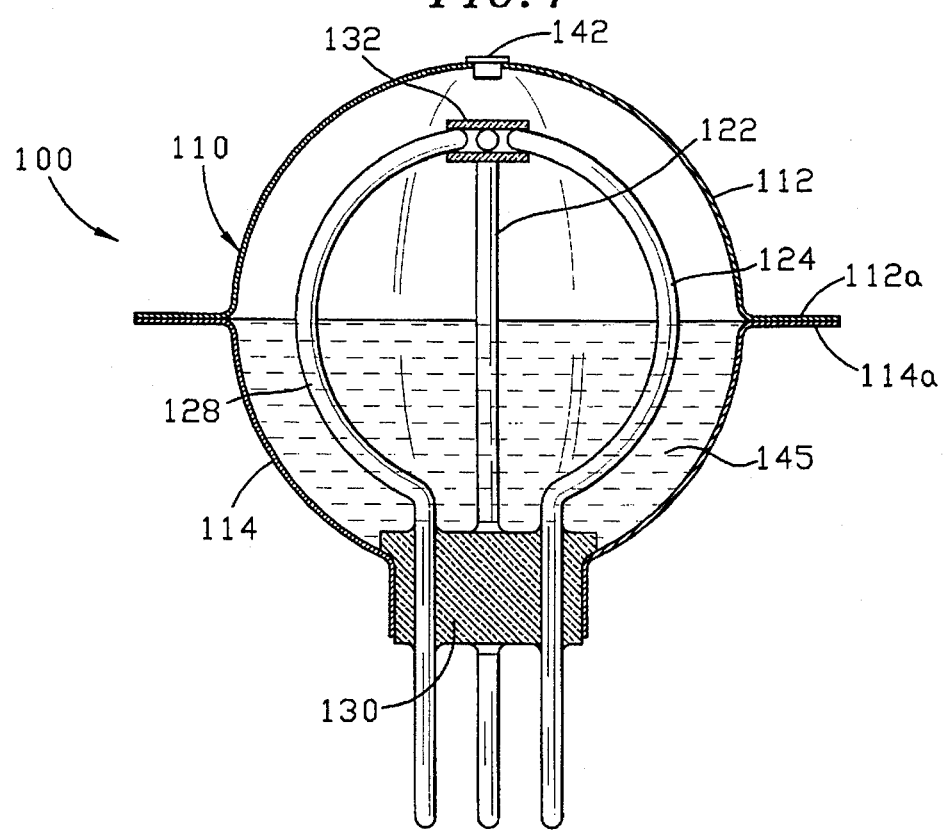
FIG. 5 is a cross-sectional view taken along line 5—5 of FIG. 4 illustrating the electrodes partially immersed in an electrolytic solution.

Referring to FIG. 5, the upper portion 112 of the sensor housing 110 is provided with a filling hole 140 that facilitates the introduction of an electrolytic solution 145 into the housing. Although, the amount of the solution can vary depending upon the intended use of the sensor, the preferred filling level is approximately 50% of the volumetric capacity of the housing. A plug 142 is provided for sealing filling hole 140 once the desired volume of solution has been introduced into the sensor. An appropriate epoxy can be utilized to seal plug 142 in place. Alternatively, a flash core resin can be used, or the hole can be welded shut by first freezing the filled cell with liquid nitrogen.

In a preferred embodiment of the subject invention, the electrodes and the two hemispherical portions of the sensor housing are constructed from the same metal. An example of an appropriate material is 52 Alloy which is a composition of nickel, cobalt, copper and iron. Other similar non-precious metals can be utilized. In such instances, the electrolyte will be selected from a group consisting of non-aqueous, semi-aqueous, or non-corrosive electrolytes. It is also envisioned that the sensor housing and the electrodes may be constructed from precious metals, such as, for example, platinum or gold. Accordingly, the electrolyte will be selected based upon criteria other than its corrosive effect.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A tilt sensor which comprises:
    a) a spherical containment vessel for sealingly containing an electrolytic solution and having an inner surface defining a common electrode; and
    b) a plurality of electrodes each including an arcuate contact portion housed within the containment vessel and a lead portion depending from the containment vessel and extending to the exterior of the containment vessel for allowing interfacing with an external electrical circuit, the arcuate contact portion of each electrode having a radius of curvature that is less than the radius of the inner surface of the spherical containment vessel.

2. A tilt sensor as recited in claim 1, wherein the spherical containment vessel is formed of a metallic material.

3. A tilt sensor as recited in claim 2, wherein the spherical containment vessel includes two hemispherical sections hermetically sealed to one another.

4. A tilt sensor as recited in claim 3, wherein each hemispherical section has a peripheral flange provided thereon which together define an equatorial flange about the containment vessel when the two sections are hermetically sealed to one another.

5. A tilt sensor as recited in claim 3, wherein one of the hemispherical sections defines an upper section and the other defines a lower section, and wherein the upper section has a filling hole formed therein for introducing the electrolytic solution into the containment vessel, and a plug is provided for plugging the filling hole.

6. A tilt sensor as recited in claim 5, wherein the lower hemispherical section has an aperture formed therein through which the lead portions of the plurality of electrodes extend to depend from the constant vessel.

7. A tilt sensor as recited in claim 6, wherein a glass preform is maintained in the aperture to seal the containment vessel, insulate the lead portions of each electrode from the containment vessel, and maintain the spacing between each electrode.

8. A tilt sensor as recited in claim 1, wherein the plurality of electrodes includes two pairs of electrodes, each pair defining a distinct tilt axis.

9. A tilt sensor as recited in claim 2, wherein the plurality of electrodes are formed from the same metallic material from which the containment vessel is formed.

10. A tilt sensor as recited in claim 1, wherein the radius of curvature of the arcuate contact portion of each electrode is constant.

11. A tilt sensor as recited in claim 10, wherein the radius of curvature of the arcuate contact portion of each electrode is greater than one half of the radius of the spherical containment vessel.

12. A tilt sensor as recited in claim 1, wherein the arcuate contact portion of each electrode has a terminal end, and the terminal ends coincide with a common insulator.

13. A tilt sensor which comprises:
 a) a containment vessel for sealingly containing an electrolytic solution and having a spherical inner surface which defines a common electrode; and
 b) a plurality of electrodes each including an arcuate contact portion housed within the containment vessel and a lead portion depending from the containment vessel and extending to the exterior of the containment vessel for allowing interfacing with an external electrical circuit, the plurality of electrodes including:
 i) a first pair of electrodes arranged in such a manner so that the arcuate contact portions thereof form a first great circle of a sphere which is concentric with the spherical inner surface of the containment vessel, the first great circle defining a first tilt axis; and
 ii) a second pair of electrodes arranged in such a manner so that the arcuate contact portions thereof form a second great circle of the sphere defining a second tilt axis which is orthogonal to the first tilt axis.

14. A tilt sensor as recited in claim 13, wherein at least the spherical inner surface of the containment vessel is formed of a metallic material, and the plurality of electrodes are formed at least in part from the same metallic material.

15. A tilt sensor as recited in claim 14, wherein the containment vessel includes two hemispherical sections which are hermetically sealed to one another.

16. A tilt sensor as recited in claim 15, wherein each hemispherical section has a peripheral flange provided thereon which together define an equatorial flange about the containment vessel when the two sections are hermetically sealed to one another.

17. A tilt sensor as recited in claim 15, wherein one of the hemispherical sections defines an upper section and the other defines a lower section, and wherein the upper section has a filling hole formed therein for introducing the electrolytic solution into the containment vessel, and a plug is provided for plugging the filling hole.

18. A tilt sensor as recited in claim 13, wherein the lower hemispherical section has an aperture formed therein through which the lead portions of the plurality of electrodes extend to depend from the constant vessel.

19. A tilt sensor as recited in claim 18, wherein a glass preform is maintained in the aperture to seal the containment vessel, insulate the lead portions of each electrode from the containment vessel, and maintain the spacing between each electrode.

20. A tilt sensor as recited in claim 13, wherein the arcuate contact portion of each electrode has a terminal end, and the terminal ends coincide with a common insulator.

* * * * *